US006615687B2

(12) United States Patent
Bendetti et al.

(10) Patent No.: US 6,615,687 B2
(45) Date of Patent: Sep. 9, 2003

(54) GRIP ASSEMBLY FOR A HANDLEBAR

(75) Inventors: Anthony Michael Bendetti, East Nassau, NY (US); Mark Lecy Hallstrom, Noblesville, IN (US)

(73) Assignee: Iron Braid, Inc., East Nassau, NY (US)

( * ) Notice: Subject to any disclaimer, the term of this patent is extended or adjusted under 35 U.S.C. 154(b) by 0 days.

(21) Appl. No.: 09/837,592

(22) Filed: Apr. 18, 2001

(65) Prior Publication Data

US 2003/0084747 A1 May 8, 2003

(51) Int. Cl.[7] ................................................ B62K 21/26
(52) U.S. Cl. ...................... 74/551.9; 74/551.8; D12/178
(58) Field of Search ............................. 74/551.9, 551.8; 16/DIG. 12, DIG. 19; D12/178

(56) References Cited

U.S. PATENT DOCUMENTS

| 450,906 | A | * | 4/1891 | Blakely | 74/551.9 |
|---|---|---|---|---|---|
| 570,186 | A | * | 10/1896 | Rockwell | 74/551.9 |
| 579,774 | A | * | 3/1897 | Rugg | 74/551.9 |
| 3,964,340 | A | | 6/1976 | Antonio et al. | |
| 4,158,407 | A | | 6/1979 | Rest | |
| 4,191,065 | A | | 3/1980 | Golobay et al. | |
| 4,416,166 | A | | 11/1983 | Jannard et al. | |
| 4,535,649 | A | | 8/1985 | Stahel | |
| 4,779,169 | A | * | 10/1988 | Cruze | 362/72 |
| 4,875,142 | A | * | 10/1989 | Spector | 362/72 |
| 4,972,733 | A | | 11/1990 | Olmr et al. | |
| 5,125,286 | A | | 6/1992 | Wilson | |
| D335,437 | S | | 5/1993 | Wilson | |
| 5,247,431 | A | * | 9/1993 | Liu | 362/72 |
| 5,325,737 | A | | 7/1994 | Bendetti | |
| 5,983,747 | A | | 11/1999 | Chen | |
| 6,035,742 | A | * | 3/2000 | Hollingsworth et al. | 74/551.9 |
| 6,112,618 | A | * | 9/2000 | Yates | 74/551.9 |
| 6,244,083 | B1 | * | 6/2001 | Carcarino | 70/242 |
| 6,263,759 | B1 | * | 7/2001 | Hollingsworth et al. | 74/551.9 |
| 6,276,230 | B1 | * | 8/2001 | Crum et al. | 74/551.9 |
| 6,308,590 | B1 | * | 10/2001 | Berto | 74/551.8 |

FOREIGN PATENT DOCUMENTS

| DE | 19722919 A1 | * | 12/1998 | 74/551.9 |
|---|---|---|---|---|
| EP | 0422291 A1 | * | 4/1991 | 362/72 |
| FR | 2424177 | * | 11/1979 | 74/551.9 |
| JP | 9-266960 | * | 10/1997 | 74/551.9 |

OTHER PUBLICATIONS

Iron Braid, Inc., mail order catalogof custom motorcycle products, pp. 3–11, published in the USA and publically available at least as early as Mar. 1, 2000. An entire original catalog (20 p.) is submitted herewith.
Detailed photographs of "Prototype" grip and grip assembly seen on p. 10 of mail order catalog of cite A just above, 7 sheets (color), where this constitutes art only in so far as disclosure of the fully assemblyed prototype was shown in the mail order catalog of cite A just above at least as early as Mar. 1, 2000, and that otherwise such detailed pictures of shown grip and assembly have not before this time been made publically available and are not now publically available except by way of this information disclosure statement.

* cited by examiner

Primary Examiner—Vinh T. Luong

(57) ABSTRACT

A grip assembly, system and process for a handlebar. The assembly includes a tubular housing adapted to fit over the handlebar and having a first end and a second end. A first tubular insert is adapted to securely fit within the first end of the tubular housing and over the handlebar. A second tubular insert, if desired, is adapted to securely fit within the second end of the tubular housing and over the handlebar. The first and second (if desired) tubular inserts can thereby secure the tubular housing to the handlebar.

33 Claims, 9 Drawing Sheets

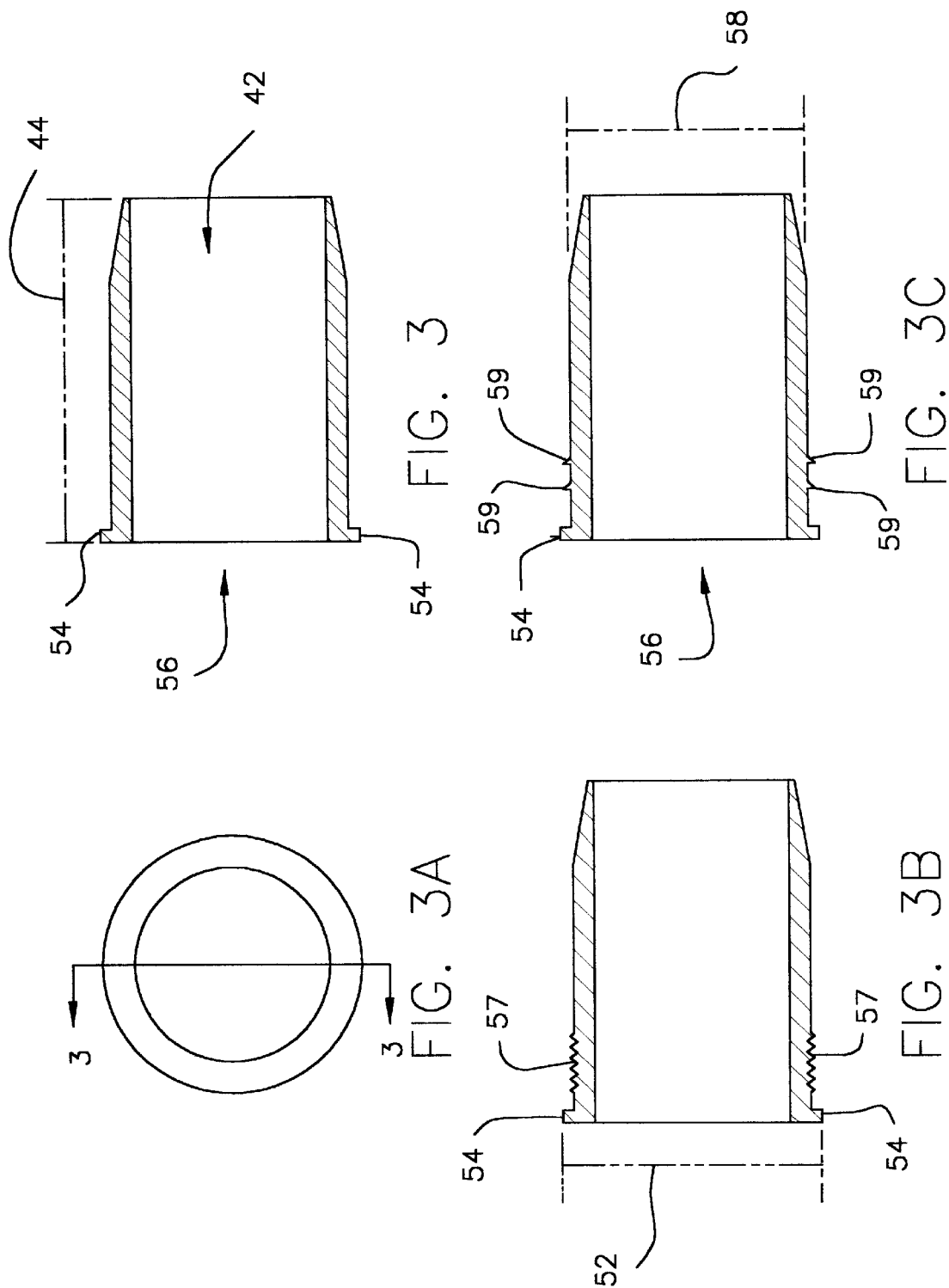

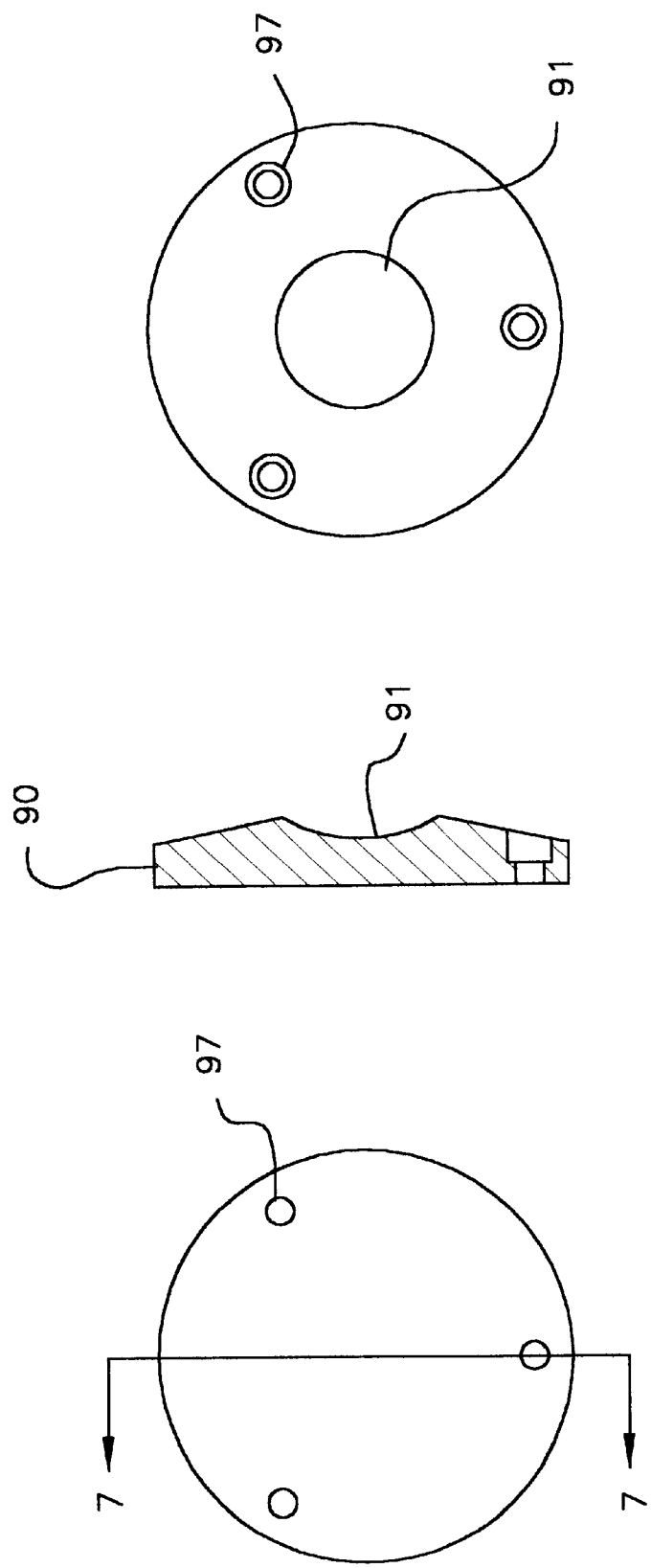

GRIP ASSEMBLY FOR A HANDLEBAR

BACKGROUND OF THE INVENTION

Many machines and vehicles, and in particular motorcycles, employ handlebars as a controlling means or device for steering the machine or vehicle. Typically, the handlebars are made of metal and usually tubular steel is used. Handlebar grips have been used in the past to alleviate many of the problems associated with handlebar usage.

Shortcomings of such prior grip devices relate to their ability to be maintained in place on the handlebar, as desired, during operation of the machine or vehicle. This is of particular importance concerning safe operation of the machine or vehicle and when it is desired to maintain the grip in place for extended periods of time during operation and at times in between. High stress forces placed upon the grip by an operator during normal operation, as well as vibration forces imparted upon the handlebar and grip during operation, are additional reasons for needing a grip that will be reliably and effectively maintained in place on the handlebar of the vehicle or machine.

SUMMARY OF THE INVENTION

The present invention is directed to avoiding one or more of the just discussed shortcomings of the prior grip devices. This can be accomplished, for example, with some or all of the features of the present grip assembly, system and process, for a handlebar.

The present invention relates to a grip assembly for a handlebar. The grip assembly can include a tubular housing, the housing having a hollow housing core and a first end and a second end. The grip assembly also includes at least one tubular insert, the insert having a hollow insert core and adapted to securely fit within the first or second end of the tubular housing.

The present invention also relates to a grip assembly including two tubular inserts. A first tubular insert is adapted to securely fit within the first end of the tubular housing and over the handlebar. A second tubular insert is adapted to securely fit within the second end of the tubular housing and over the handlebar. The first and second tubular inserts thereby can secure the tubular housing to the handlebar.

The present invention also relates to a grip assembly system. The system can include a motorcycle handlebar having an inner end portion and an outer end portion. The system can also include a tubular housing fit over the handlebar and having a first end and a second end. The system can further include a first tubular insert securely fit within the first end of the housing and over the inner end portion of the handlebar, and a second tubular insert securely fit within the second end of the housing and over the outer end portion of the handlebar. The first and second tubular inserts thereby secure the tubular housing to the handlebar.

The present invention also relates to a grip assembly process. The process can include securely fitting a first tubular insert within a first end of a tubular housing. The process also includes fitting the first tubular insert and the tubular housing over an end portion of a handlebar. The process can further include securing the tubular housing and the first tubular insert to the end portion of the handlebar.

The present invention also relates to a grip that can include, in combination with the housing and insert(s) some or all of the features provided by: the insert(s) having a ridge(s); at least one ring; the ring(s) having at least one recess; an end cap; and, particular relationships between one or more components of the invention.

These and other features and functions of the present invention will be explained and understood upon reviewing the following detailed description with reference to the accompanying drawings.

BRIEF DESCRIPTION OF THE DRAWINGS

FIG. 3 shows a lengthwise sectional view of a tubular insert of the present invention, taken along the line 3—3 of FIG. 3A.

FIG. 3A shows an end view the tubular insert of FIG. 3.

FIG. 3B shows a lengthwise sectional view of an alternate tubular insert of the present invention, taken along the line 3—3 of FIG. 3A.

FIG. 3C shows a lengthwise sectional view of yet an alternate tubular insert of the present invention, taken along the line 3—3 of FIG. 3A.

FIG. 7 shows a cross sectional view of an end cap of the present invention, taken along the line 7—7 of FIG. 7A.

FIG. 7A shows an end view of the end cap of FIG. 7.

FIG. 7B shows an opposite end view of the end cap of FIG. 7.

DETAILED DESCRIPTION OF THE INVENTION

Figure 1:
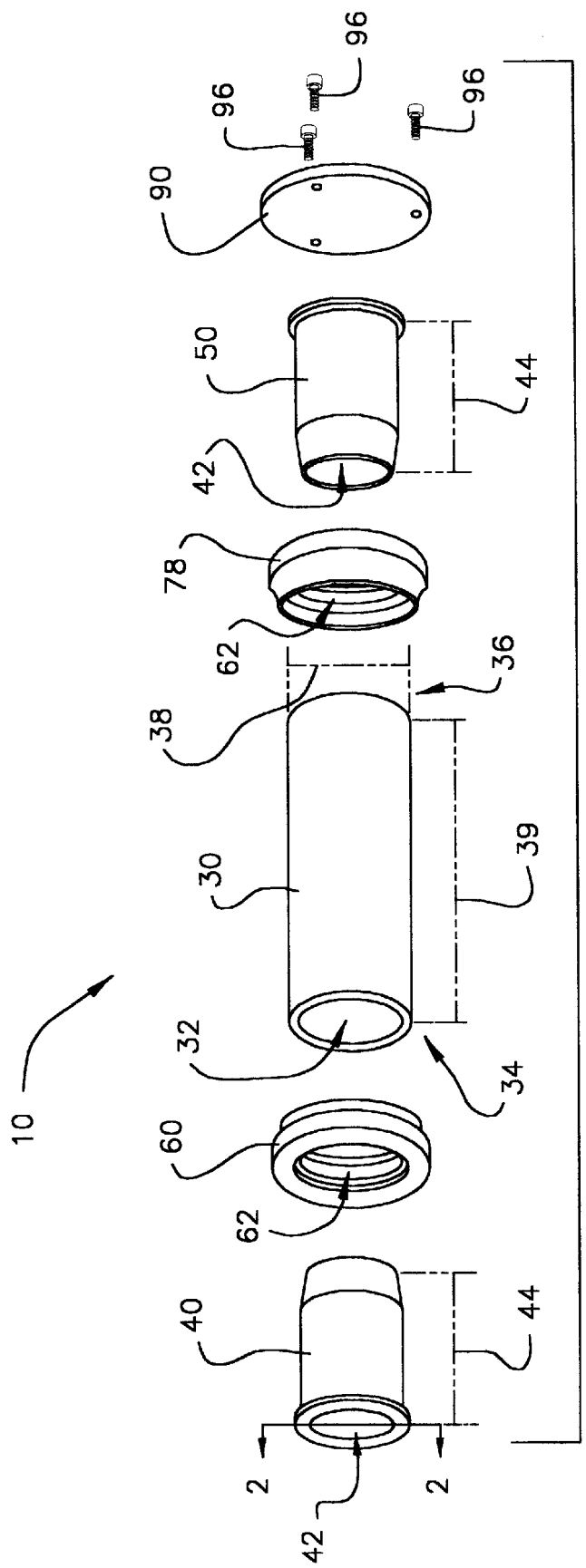
FIG. 1 shows an exploded perspective view of the present invention.

As seen in the drawings, e.g., FIG. 1, there is schematically depicted a grip assembly 10 of the present invention. Assembly 10 includes a tubular housing 30 having a hollow housing core 32 and a first end 34 and a second end 36. Assembly 10 also includes a first tubular insert 40 having a hollow insert core 42 and adapted to securely fit within the first end 34 or second end 36 of the tubular housing. As used herein, "tubular" means any structure having a hollow core through its end-to-end axis and its cross sectional shape can be most any geometric configuration, e.g., circular, triangular, rectangular, square, 5-sided, 6-sided, etc. Assembly 10 can also include a second tubular insert 50, the same or similar to the first insert 40, adapted to fit securely within the second end 36 of the housing. Assembly 10 can also include a first ring 60 having a hollow ring core 62 and adapted to be located adjacent the first tubular insert 40 and the first end of the tubular housing 34. Assembly 10 can also include a second ring 78, the same or similar to the first ring 60, locatable adjacent the second tubular insert 50 and the second end 36 of the tubular housing. Assembly 10 can also include an end cap 90 connectable adjacent an end 56 (FIG. 3) of the second tubular insert 50.

Figure 2:
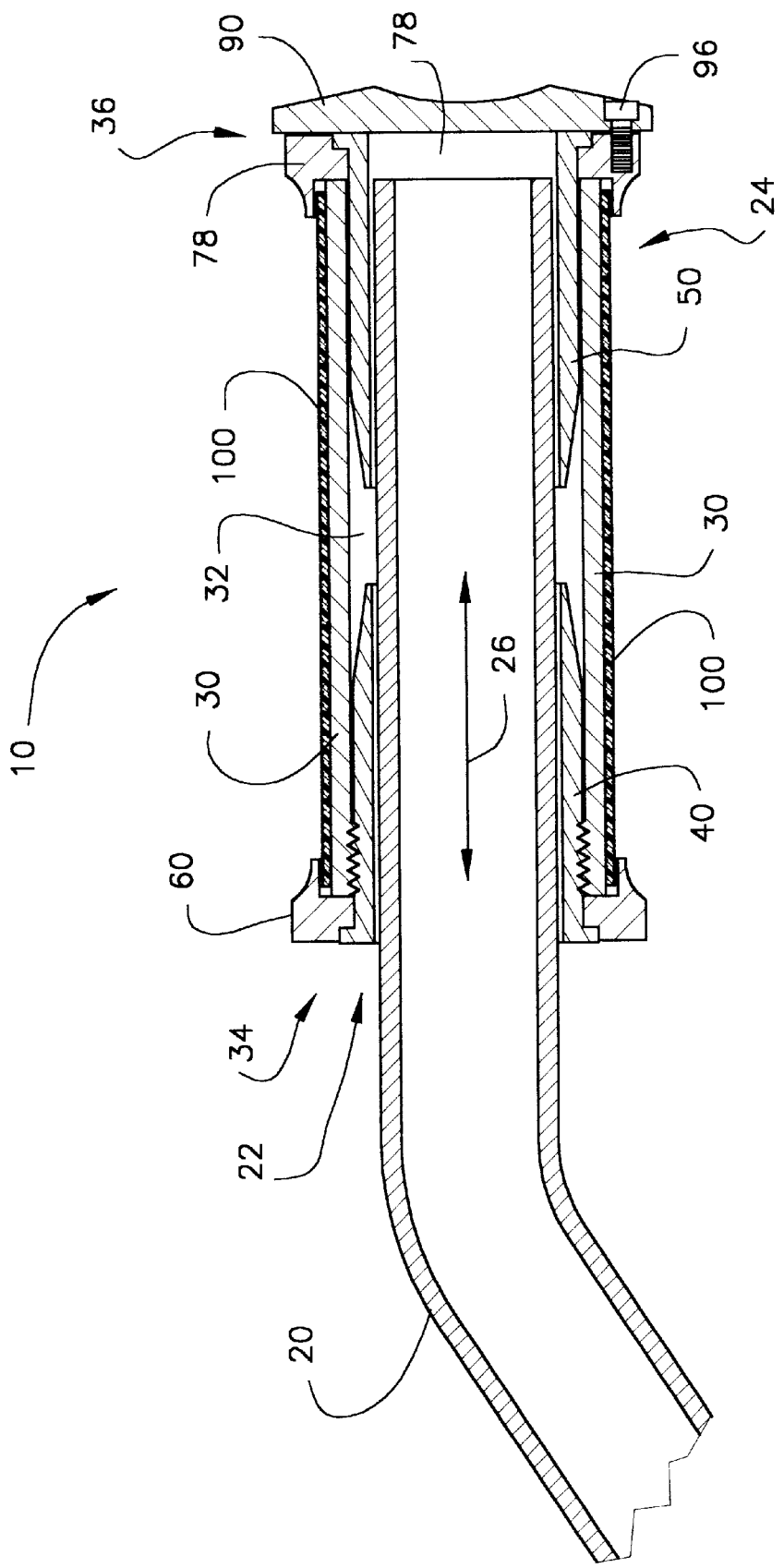
FIG. 2 shows a lengthwise sectional view of the present invention schematically assembled together on a handlebar, representatively taken along the line 2—2 of FIG. 1.
Figure 2A:
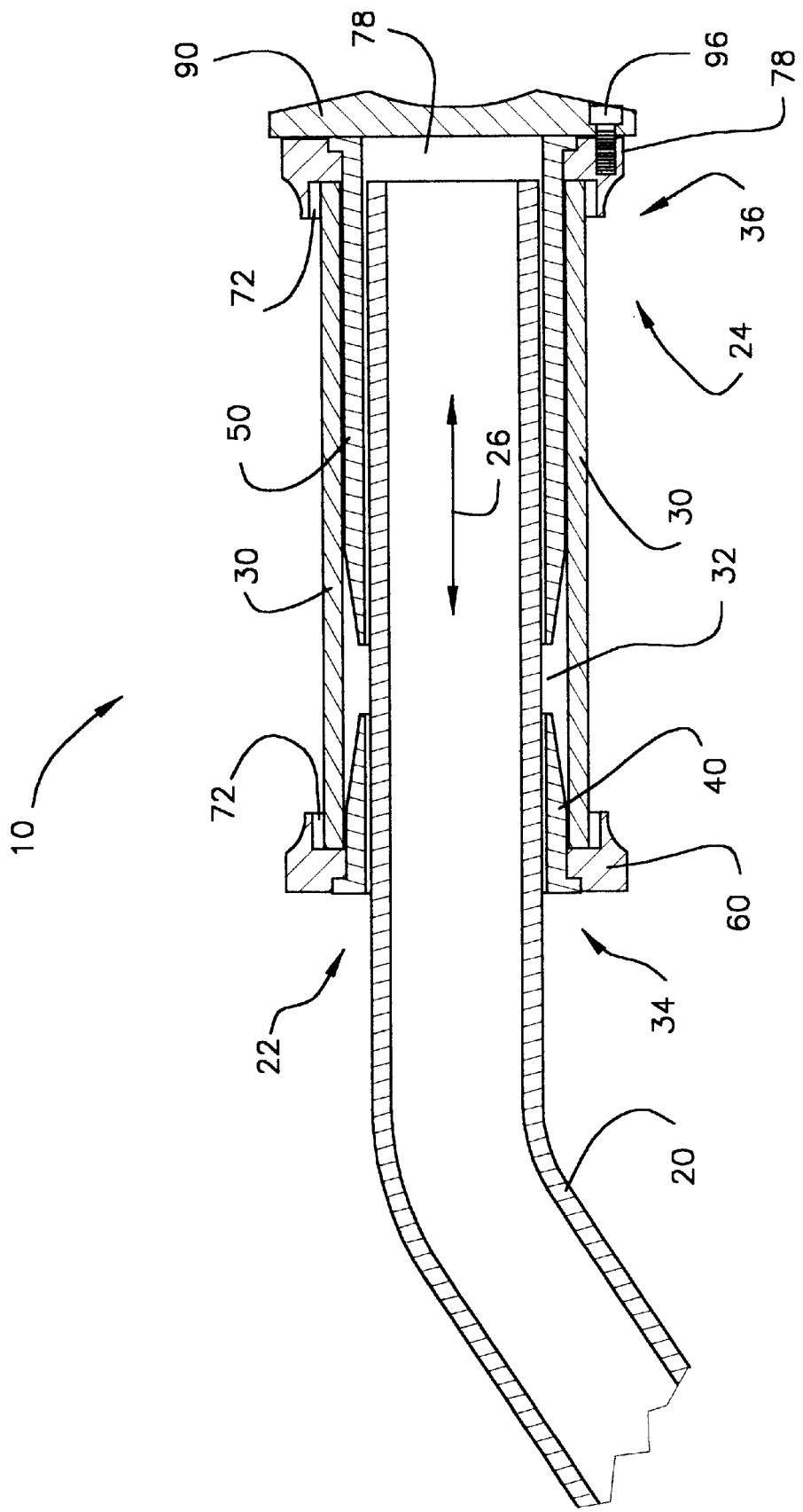
FIG. 2A shows a lengthwise sectional view of the present invention schematically assembled together on a handlebar, representatively taken along the line 2—2 of FIG. 1.

Referring to FIGS. 2 and 2A, assembly 10 is fully assembled together and secured to a handlebar 20. Assembly 10 can be partially to fully assembled before it is secured to handlebar 20. Assembly 10 can also be assembled piece by piece directly onto handlebar 20 until it is fully assembled in place over the handlebar. Assembly 10 fits over handlebar 20 which has an inner end portion 22 and an outer end portion 24. Handlebar 20 can be that of a machine or vehicle, such as that of a motorcycle. When assembly 10 is secured to handlebar 20, this includes being directly secured to handlebar 20 and being indirectly secured to handlebar 20. For example, with a motorcycle handlebar a conventional throttle sleeve may be positioned immediately over the outer circumference of the handlebar 20. In such a case, the assembly 10 fits over the throttle sleeve and is secured directly to the throttle sleeve, and thus, indirectly to the handlebar because assembly 10 is secured directly to the throttle sleeve and the sleeve is secured directly to the handlebar. In this way, assembly 10 can be maintained in place longitudinally relative to the length of the handlebar and it can also rotate axially around the handlebar for throttle purposes.

The tubular inserts 40 and 50 act to maintain the tubular housing 30 in place relative to a length 26 of the handlebar. For example, this includes preventing to substantially preventing longitudinal movement of the tubular housing relative to the length 26 of the handlebar (e.g., for use with either side of a motorcycle handlebar, that is, with or without a throttle sleeve). This can also include, but need not include, preventing to substantially preventing axial (i.e., rotational) movement of the tubular housing relative to the length 26 of the handlebar (e.g., for use with the non-throttle side of a motorcycle handlebar). Maintaining housing 30 in place can be accomplished, for example, by use of friction fitting engagement relationships between the tubular inserts and the handlebar and between the tubular inserts and the tubular housing, such as is possible with precision dimensioned parts. This can also be accomplished, for example, by use of more variable dimensioned parts in combination with adhesive or adhesive like materials between the tubular inserts and the handlebar and between the tubular inserts and the tubular housing. This can also be accomplished, for example, by use of conventional welding and/or bonding techniques between the tubular inserts and the handlebar and between the tubular inserts and the tubular housing, as well as by other conventional means for joining parts together, such as threaded mating structures or other mating type structures. Preferably, once a user has secured assembly 10 to handlebar 20 the assembly is near permanently maintained in place until the user takes intentional measures (which can include actually destroying assembly 10) to remove assembly 10 from handlebar 20. The extent of the measures that have to be taken depends on what is necessary to break the bond or seal between the inserts and the handlebar. If adhesive is used, then force necessary to break that bond is required. If a snap fit relationship, threaded relationship or other type of more easily removable relationship between the tubular inserts and the handlebar is used then the assembly 10 may be able to be removed in tact. Also, if a throttle sleeve is disposed between the assembly and the tubular housing, then this can be more easily removed without destroying the entire assembly 10.

Assembly 10 can also include a grip 100 encircling the tubular housing 30. The grip is preferably securely fixed to the tubular housing for little to no movement during use of the grip assembly 10 in place over the handlebar 20. Grip 100 can be secured to the housing 30 before, during or after assembly of grip assembly 10. A variety of conventional techniques can be used to so secure grip 100. Similarly, grip 100 can be made of a variety of conventional grip materials, such as natural or synthetic materials, leather, rubber, foam rubber, polymer containing materials, and the like. A couple examples of such grip materials and securement techniques are seen in U.S. Pat. No. 5,325,737 issued Jul. 5, 1994 of the present applicant and which is incorporated herein by reference, and U.S. Pat. No. 4,535,649 issued Aug. 20, 1985 of Alwin J. Stahel and which is incorporated herein by reference.

Figures 4, 4A, 4B:
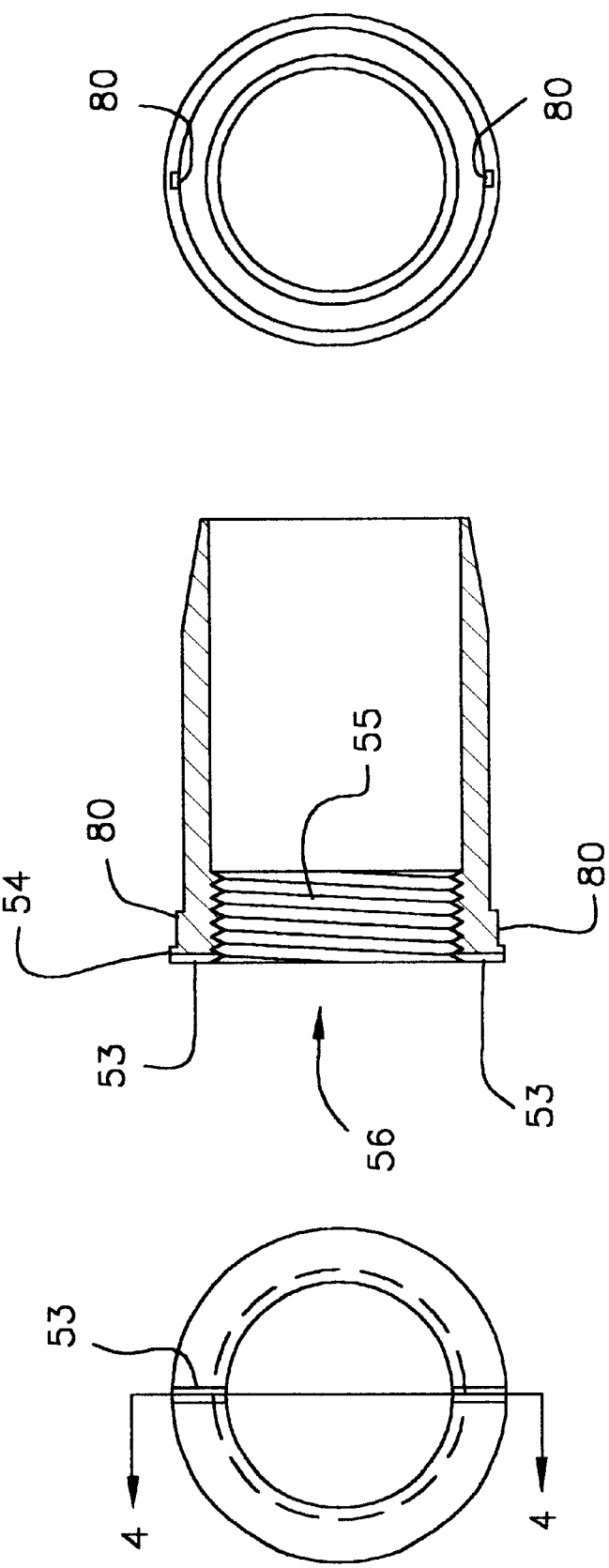
FIG. 4 shows a lengthwise sectional view of yet an alternate tubular insert of the present invention, taken along the line 4—4 of FIG. 4A.
FIG. 4A shows an end view of the insert of FIG. 4.
FIG. 4B shows an opposite end view of the insert of FIG. 4.

Referring to FIGS. 3 to 4B, inclusive, there are seen various configurations for the tubular inserts 40 and 50 of the present invention. For example, FIGS. 3 and 3A show the tubular inserts 40 and 50 having an outer diameter 58 which is sized and/or configured for a fitted relationship with the tubular housing 30. When there is a pair, the two inserts 40 and 50 can have a combined length equal to about a length 39 of the tubular housing. Although one tubular insert functions sufficiently to practice features of the present invention, two tubular inserts can function even better in some regards and it is not any particular length 44 of the insert(s) that necessarily matters, but rather the relationship between the tubular housing 30 and the tubular insert(s) to ultimately thereby secure the tubular housing 30 to the handlebar 20. For example, when there is a pair of inserts, at least one insert can have length 44 equal to or less than about ½ a length of the tubular housing. Conversely, when there is a single tubular insert, the insert can have length 44 equal to or greater than about ½ the length of the tubular housing, and preferably greater than ⅔ the length of the tubular housing.

FIGS. 3B, 3C, 4, and 4A depict other configurations for the tubular insert. FIG. 3B shows a threaded outer portion 57 that could be mated to an inner threaded tubular housing 30 (FIG. 2). In this way the tubular insert(s) could be more easily removably fit and secured within housing 30, rather than by use of adhesives or other more permanent techniques. To assist with installing such a threaded tubular insert, the tubular insert can have at least one groove 53 located in the end 56 of the tubular insert. FIG. 3C shows a locking ridge or protrusion 59 on the outer surface of the insert. The protrusion can be partially or completely encircling the outer circumference of the insert. The protrusion can be made of a material that is flexible and fits within the tubular housing 30 having a smooth inner surface as seen in FIGS. 2 and 2A, and with or without an adhesive or other discussed techniques, to thereby secure the tubular insert to the tubular housing. Differently, the protrusion(s) 59 can be made of a material that is rather rigid and mates with a partial or complete annular groove(s) on the inside surface of the tubular housing (not shown), as would be understood by one of ordinary skill in the art based on FIG. 3C and the discussion here.

The tubular inserts can include a ridge 54, and the ridge can be located at the end 56 of the tubular insert and/or outside of the tubular housing when the tubular insert is fit within the first or second end of the tubular housing (e.g., FIG. 2). The ridge 54 can extend radially outward to a distance 52 which is greater than the outer diameter 58 of the tubular insert. For example, in this way, the ridge can assist the tubular insert in locating and maintaining the tubular housing in place relative to the tubular insert and the handlebar. The ridge can butt up adjacent an end of the tubular housing, or it could be mated with the end of the housing, or it can be spaced therefrom but configured for engagement with one or more other parts that can lie between the ridge and the end of the housing 30.

Figures 5, 5A, 5B:
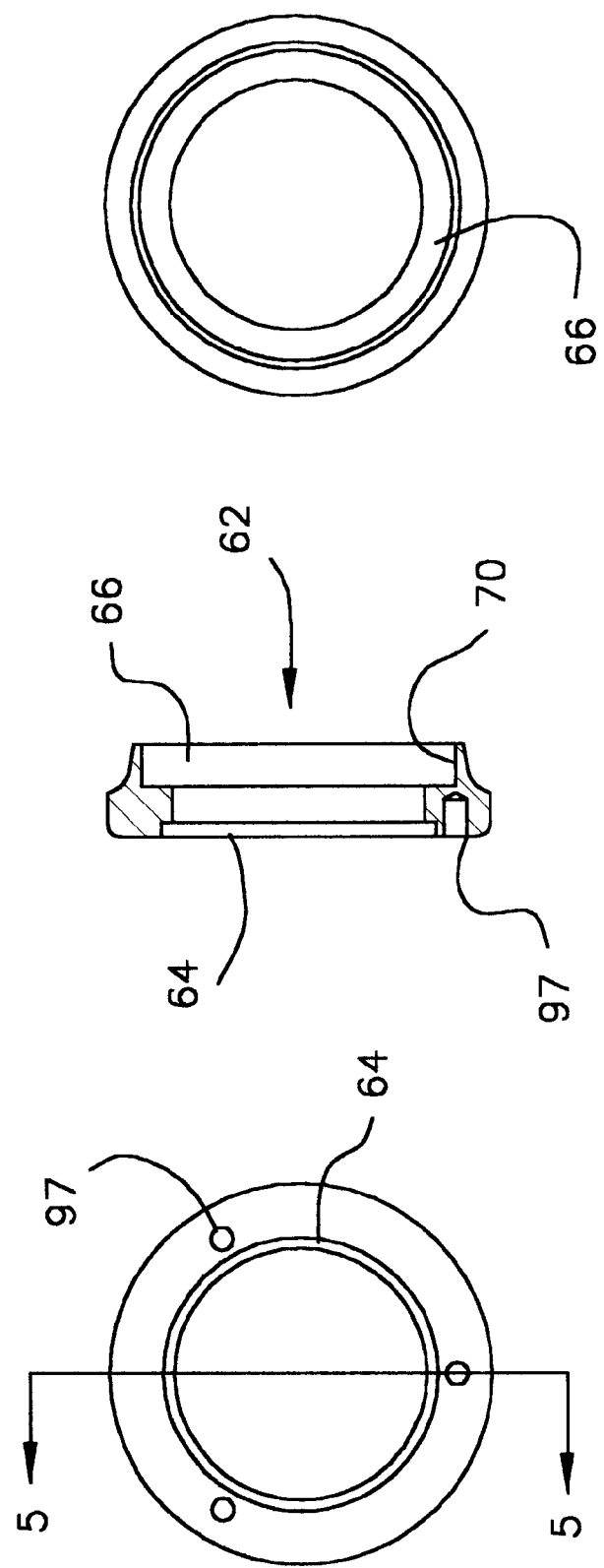
FIG. 5 shows a cross sectional view of a ring of the present invention, taken along the line 5—5 of FIG. 5A.
FIG. 5A shows an end view of the ring of FIG. 5.
FIG. 5B shows an opposite end view of the insert of FIG. 5.
Figure 6B:
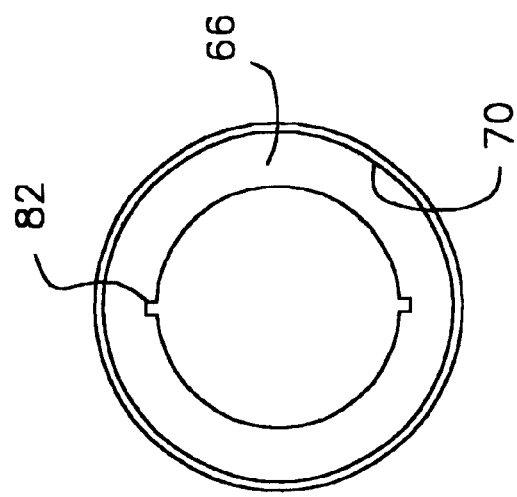
FIG. 6B shows an opposite end view of the insert of FIG. 6.
Figure 6:
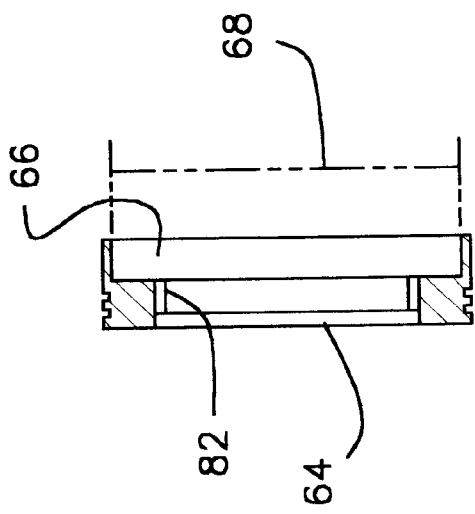
FIG. 6 shows a cross sectional view of an alternate ring of the present invention, taken along the line 6—6 of FIG. 6A.
Figure 6A:
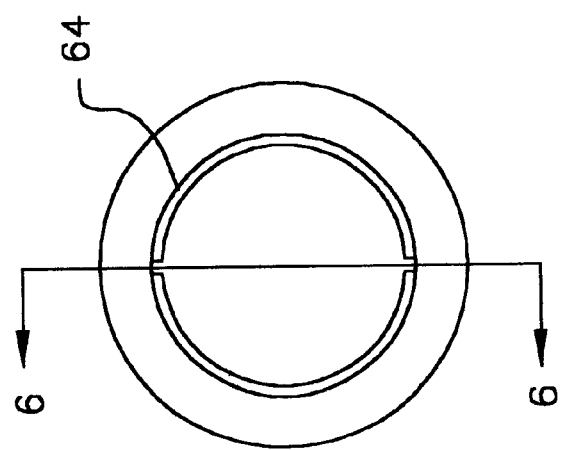
FIG. 6A shows an end view of the ring of FIG. 6.

FIGS. 5 to 6B, inclusive, depict various configurations for the rings 60 and 78 of the present invention. Each ring can have a first recess 64 adapted to receive the ridge 54 of the tubular insert. The ridge 54 and the first recess 64 can engage each other in a fitted relationship. For example, such can be as simple as a mere circumferential relationship with one fitting within the other, partially to completely. Alternatively or additionally, it can be more extensive like where the tubular insert and the ring engage each other in an interlocking relationship to prevent annular rotation of the ring relative to the tubular insert. The can be accomplished, e.g., by a combination of a protrusion 80 (FIGS. 4 and 4B for the tubular insert) and a notch 82 (FIGS. 6 and 6B for the ring) adapted to receive the protrusion 80. The location of protrusion 80 and notch 82 can be varied and reversed and the shape of each is not important and long as such enables an interlocking relationship. Yet alternatively or additionally, the fitted relationship can be where the ring is sandwiched between the tubular insert and the first or second end of the tubular housing and thereby the tubular insert maintains the ring in place relative to the length 39 of the tubular housing. Yet alternatively or additionally, the fitted relationship can include the rings 60 and 78 having a second recess 66 adapted to receive the first 34 or second 36 end of the tubular housing. The second recess 66 can have a diameter 68 (FIG. 6) larger than an outer diameter 38 (FIG. 1) of the tubular housing 30. Also, a circumference 70 of the second recess 66 can encircle the end 34 or 36 of the tubular housing (as seen in FIGS. 2 and 2A). Still also, as seen in FIGS. 2 and 2A, a circumferential space 72 can be located between the second recess 66 and the tubular housing 30. In this way, the grip 100 can be tucked or inserted adjacent the second recess 66 between its circumference 70 and the outer diameter or surface 38 of the tubular housing 30.

Figures 8, 8A, 8B:
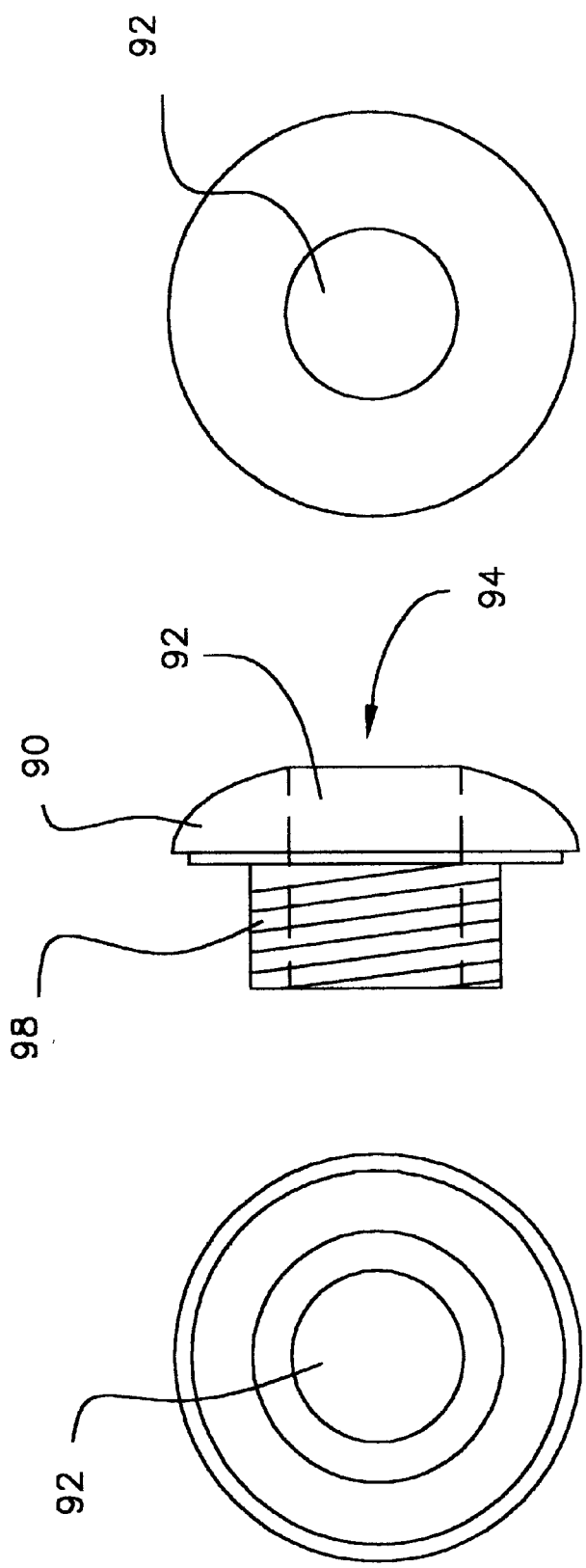
FIG. 8 shows a side view of an alternate end cap of the present invention.
FIG. 8A shows an end view of the end cap of FIG. 8.
FIG. 8B shows an opposite end view of the end cap of FIG. 8.

FIGS. 7 to 8B, inclusive, depict various configurations for the end cap 90 of the present invention. For each, the end cap 90 can be joined with the remainder of the assembly by various techniques. For example, cap 90 can be connected adjacent end 56 of the tubular insert by being joined to the ring 78 or joined to the tubular insert 50. As seen in FIGS. 7, 7A, 7B, and 2, one way to join the cap 90 to the ring 78 is by way of one or more securement holes 97 about the perimeter of the cap 90 and ring 78 where the hole(s) can receive a screw, bolt or similar securement structure 96 to join the end cap and ring together. Alternatively, end cap 90 could be shaped like that in FIG. 7, but have no screw or bolt holes and instead be joined to the assembly by a fitted or adhesive, or other such relationship of one surface against the other. As seen in FIGS. 8, 8A and 4, end cap 90 can have an outer threaded portion or other structure 98 which is joined to the tubular insert 50 have a mating inner threaded portion or complementary structure 55. Alternatively, end cap 90 could be shaped like that in FIG. 8, but have no threads and instead be joined to the assembly by a fitted, adhesive, or other such relationship. The end cap 90 can be donut shaped with a hole 92 extending through a middle portion 94 of the end cap. Differently, the end cap can be a solid disk-like structure with a dished out portion 91 or without such a dished out portion.

The present invention is also directed to a grip assembly process. As stated previously, the entire assembly 10 can be fully assembled before or after being fitted over and secured to handlebar 20. In either case, one or more of the following steps can be followed, and in the following order as desired. First, securely fit tubular insert 40 or 50 within end 34 or 36 of tubular housing 30. At the same time as the first step, one can also locate ring 60 or 78 adjacent tubular insert 40 or 50 and the end 34 or 36, respectively, of the tubular housing. Second, securely fit second tubular insert 50 or 40 within end 36 or 34 of the tubular housing opposite the other end of the tubular housing. At the same time as the second step, one can also locate second ring 78 or 60 adjacent second tubular insert 50 or 40 and the end 36 or 34, respectively, of the tubular housing. Now, or subsequent to the fifth step, one can connect end cap 90 adjacent end 56 of tubular insert 50. Additionally, prior to the first step, now or subsequent to the fifth step, one can encircle the tubular housing with grip 100. Third, fit tubular insert 40 or 50 and the tubular housing over outer end portion 24. Fourth, fit tubular insert 40 or 50 and the tubular housing over inner end portion 22 and simultaneously fit tubular insert 50 or 40 and the tubular housing over outer end portion 24 of the handlebar. Fifth, at the same time as step four, or subsequent thereto, secure the tubular inserts 40 and 50 to the inner 22 and outer 24 end portions of the handlebar 20, and thereby secure the tubular housing to the handlebar.

The components of assembly 10 can be made of various materials. With exception of grip 100 as described above, such materials can have a semi-rigid to rigid characteristic so as to be able to endure the stresses the grip assembly will be subjected to during its intended lifetime. For example, while all the components could be made of the same or different materials, and these could be metals, plastics and substitutes therefor as would be known to those of skill in the art, the tubular housing 30 and tubular inserts 40 and 50 can be plastic, the rings 60 and 78 can have an aluminum core with a chrome finish, and the bolts 96 can be stainless steel. The assembly 10 and its several possible components can be made to various sizes as long as the relative size relationships between certain components, as discussed above, are maintained. Otherwise, generally, the type of handlebar for which the grip assembly is intended and the desires/attributes of the machine or vehicle user, will dictate what the overall size of the tubular housing is and from there the other components can be determined as would be known to one of ordinary skill in the art in combination with the teachings herein. Additionally, it should be understood that certain of the components, while shown and described here as independent of each other, could be readily formed as a single structure. Such a combination could be made as long as the combined structure still performs the required, and when not required, desired, function(s) of the underlying components, e.g., a tubular insert and a ring, a tubular insert and an end cap, a tubular insert and a ring and an end cap.

While the invention has been described in connection with various features and advantages, such is not intended to limit the scope of the invention to the particular form set forth, but, on the contrary, the invention is intended to cover such alternatives, modifications and equivalents as may be defined by the scope of the following claims.

What is claimed is:

1. A grip assembly in combination with a handlebar, comprising:
   a tubular housing having a hollow housing core and the tubular housing having a first end and a second end wherein the tubular housing is fitted over the handlebar;
   at least one tubular insert having a hollow insert core and adapted to securely fit at least partially within the first or second end of the tubular housing and over the handlebar, wherein the tubular insert includes a ridge, the ridge located at an end of the tubular insert outside of the tubular housing when the tubular insert is fit within the first or second end of the tubular housing; and,
   at least one ring having a hollow ring core and located over the tubular insert between the ridge on the tubular insert and the first or second end of the housing.

2. The assembly of claim 1 wherein the at least one tubular insert comprises two tubular inserts.

3. The assembly of claim 2 wherein the two tubular inserts have a combined length equal to about the length of the tubular housing.

4. The assembly of claim 1 wherein the tubular insert has an outer diameter and the ridge extends radially outward to a distance greater than the outer diameter of the tubular insert.

5. The assembly of claim 4 wherein the ring has a first recess adapted to receive the ridge of the tubular insert.

6. The assembly of claim 5 wherein the ridge and the first engage each other in a fitted relationship.

7. The assembly of claim 1 wherein the ring is sandwiched between the ridge on the tubular insert and the first or second end of the tubular housing and wherein the tubular insert maintains the ring in place relative to the length of the tubular housing.

8. The assembly of claim 7 wherein the ring has a second recess adapted to receive the first or second end of the tubular housing.

9. The assembly of claim 8 wherein the second recess has a diameter larger than an outer diameter of the tubular housing and a circumference of the second recess encircles the end of the tubular housing.

10. The assembly of claim 9 further comprising a circumferential space located between the second recess and the tubular housing.

11. The assembly of claim 7 wherein the tubular insert is securely fit at least partially within the first or second end of the tubular housing and the ring is located adjacent the tubular insert and the first or second end of the tubular housing and the tubular housing and the tubular insert and the ring are fit over the handlebar and secured to the handlebar.

12. The assembly of claim 1 wherein the tubular insert has at least one groove located in an end of the tubular insert spaced from the tubular housing.

13. The assembly of claim 1 further comprising an end cap adapted to be connected adjacent an end of the tubular insert.

14. The assembly of claim 13 wherein the end cap is joined to the tubular insert.

15. The assembly of claim 13 wherein the end cap is donut shaped with a hole extending through a middle portion of the end cap.

16. The assembly of claim 13 wherein the tubular insert is securely fit at least partially within the first or second end of the tubular housing and the end cap is connected adjacent the end of the tubular housing and the tubular insert are fit over the handlebar and secured to the handlebar.

17. The assembly of claim 1 further comprising an end cap adapted to be connected adjacent an end of the tubular insert by being joined to the ring.

18. The assembly of claim 1 further comprising the tubular insert and the ring engaging each other in an interlocking relationship to prevent annular rotation of the ring relative to the tubular insert.

19. The assembly of claim 18 wherein the interlocking relationship comprises a combination of a protrusion and a notch adapted to receive the protrusion.

20. The assembly of claim 1 further comprising a grip encircling the tubular housing.

21. The assembly of claim 1 wherein the tubular insert is securely fit at least partially within the first or second end of the tubular housing and the tubular housing and the tubular insert are fit over the handlebar and secured to the handlebar.

22. A grip assembly for a handlebar, comprising:
   a tubular housing adapted to fit over the handlebar and having a first end and a second end;
   a first tubular insert adapted to securely fit at least partially within the first end and of the tubular housing and over the handlebar and a second tubular insert adapted to securely fit at least partially within the second end of the tubular housing and over the handlebar wherein the first and second tubular inserts thereby can secure the tubular housing to the handlebar; and,
   at least one ring adapted to fit over the handlebar and be located between a ridge on the first or second tubular insert and the first or second end of the tubular housing, respectively, and wherein the ring has recess adapted to receive the first or second end of the tubular housing and the recess has a diameter larger than an outer diameter of the tubular housing and a circumference of the recess encircles the end of the tubular housing.

23. The assembly of claim 22 wherein the tubular inserts each have a length equal to or less than about ½ a length of the tubular housing.

24. The assembly of claim 22 wherein the ring is sandwiched between the ridge on the tubular insert and the respective first or second end of the tubular housing whereby the tubular insert maintains the ring and the tubular housing in place relative to a length of the handlebar.

25. The assembly of claim 24 wherein the first and second tubular inserts are securely fit at least partially within the respective first and second ends of the tubular housing and an end cap is connected adjacent the end of the tubular insert before the tubular housing and the tubular insert are fit over the handlebar.

26. The assembly of claim 22 wherein the ring includes a first recess adapted to receive the ridge of the tubular insert.

27. The assembly of claim 22 further comprising an end cap adapted to be connected adjacent an end of at least one of the tubular inserts.

28. The assembly of claim 22 further comprising a grip encircling the tubular housing.

29. The assembly of claim 22 wherein the first and second tubular inserts are securely fit at least partially within the respective first and second ends of the tubular housing before the tubular housing and the tubular inserts are fit over the handlebar.

30. The assembly of claim 22 wherein the first and second tubular inserts are securely fit at least partially within the respective first and second ends of the tubular housing and the at least one ring is located adjacent the first or second tubular insert and the first or second end of the tubular housing, respectively, before the tubular housing and the tubular insert and the ring are fit over the handlebar.

31. A grip assembly system comprising:
   a motorcycle handlebar having an inner end portion and an outer end portion;
   a tubular housing fit over the handlebar and having a first end and a second end;
   a first tubular insert securely fit at least partially within the first end of the housing and over the inner end portion of the handlebar and a second tubular insert securely fit at least partially within the second end of the housing and over the outer end portion of the handlebar wherein the first and second tubular inserts secure the tubular housing to the handlebar; and,
   a first ring sandwiched between a ridge on the first tubular insert and the first end of the tubular housing and a second ring sandwiched between a ridge on the second tubular insert and the second end of the tubular housing whereby the tubular inserts maintain the rings and the tubular housing in place relative to a length of the handlebar, wherein each ring includes a first recess adapted to receive, respectively, the ridge of each tubular insert and each ring has a second recess adapted to receive the first and second ends, respectively, of the tubular housing and each second recess has an inner diameter larger than a diameter of the tubular housing and a circumference of each second recess encircles the end, respectively, of the tubular housing.

32. The assembly of claim 31 further comprising a grip encircling the tubular housing.

33. The assembly of claim 32 further comprising an end cap connected adjacent an end of the second tubular insert.

* * * * *

UNITED STATES PATENT AND TRADEMARK OFFICE
CERTIFICATE OF CORRECTION

PATENT NO. : 6,615,687 B2
DATED : September 9, 2003
INVENTOR(S) : Bendetti et al.

It is certified that error appears in the above-identified patent and that said Letters Patent is hereby corrected as shown below:

Column 7,
Line 19, insert -- tubular -- between "the" and "housing."
Line 31, insert -- recess -- between "first" and "engage".

Column 8,
Line 1, insert -- insert -- after the first instance of "tubular", delete "housing", and insert -- the tubular housing and -- between "and" and "the tubular insert".
Line 24, delete "and" after "the first end".

Signed and Sealed this

Twenty-second Day of March, 2005

JON W. DUDAS
*Director of the United States Patent and Trademark Office*